US007031292B2

(12) United States Patent
Laroia et al.

(10) Patent No.: US 7,031,292 B2
(45) Date of Patent: Apr. 18, 2006

(54) METHOD OF SCHEDULING REGULAR SIGNAL TRANSMISSION IN A CELLULAR WIRELESS SYSTEM

(75) Inventors: Rajiv Laroia, Basking Ridge, NJ (US); Junyi Li, Bedminster, NJ (US); Vladimir Parizhsky, New York, NY (US)

(73) Assignee: Flarion Technologies, Inc., Bedminster, NJ (US)

( * ) Notice: Subject to any disclaimer, the term of this patent is extended or adjusted under 35 U.S.C. 154(b) by 909 days.

(21) Appl. No.: 10/094,596

(22) Filed: Mar. 8, 2002

(65) Prior Publication Data

US 2002/0154621 A1 Oct. 24, 2002

Related U.S. Application Data

(60) Provisional application No. 60/274,857, filed on Mar. 9, 2001.

(51) Int. Cl.
*H04B 7/212* (2006.01)

(52) U.S. Cl. ...................... 370/347; 370/442
(58) Field of Classification Search ............... 370/347, 370/442, 277, 280, 281, 294, 320, 321, 329, 370/330, 335, 337, 342, 395.4
See application file for complete search history.

(56) References Cited

U.S. PATENT DOCUMENTS

| 5,506,848 A | * | 4/1996 | Drakopoulos et al. ...... 370/336 |
| 6,940,824 B1 | * | 9/2005 | Shibutani .................... 370/252 |

* cited by examiner

*Primary Examiner*—Chi Pham
*Assistant Examiner*—Alexander O. Boakye
(74) *Attorney, Agent, or Firm*—Straub & Pokotylo; Michael P. Straub (57) ABSTRACT

Scheduling of regular signal transmissions, e.g., between a plurality of wireless terminals and a base station in a cellular network in a manner designed to reduce or minimize recurring periodic interference encountered by individual wireless terminals from transmission in neighboring cells is described. Signal transmissions of wireless terminals in each cell are scheduled on a group slot basis. A group slot comprises a number of time slots. Each wireless terminal serviced by a particular base station is assigned a time slot in a group slot used by the particular base station. A given wireless terminal is assigned different time slots in successive group slots as specified by a hopping function. Adjacent, base stations e.g., base stations of physically neighboring or overlapping cells, use distinct, i.e., different, hopping functions for the scheduling purpose thereby avoiding correlation of slots between overlapping or adjacent cells during consecutive group slots.

31 Claims, 5 Drawing Sheets

METHOD OF SCHEDULING REGULAR SIGNAL TRANSMISSION IN A CELLULAR WIRELESS SYSTEM

RELATED APPLICATIONS

The present application claims the benefit of U.S. Provisional patent application Ser. No. 60/274,857 filed Mar. 9, 2001.

FIELD OF THE INVENTION

The present invention relates to communications systems and, more particularly, to methods and apparatus for scheduling signal transmissions, e.g., in a cellular communications network.

BACKGROUND

In a cellular wireless system, a service area is divided into a number of coverage zones referred to as cells. Wireless terminals in a cell communicate with the base station that serves the cell. Wireless terminals may include a wide range of mobile devices including, e.g., cell phones and other mobile transmitters such as personal data assistants with wireless modems.

There are scenarios in which certain signals are transmitted from each of the wireless terminals in a cell to the base station in the cell on a regular basis. For example, a wireless terminal may be required to notify the base station of its presence in the cell at various time intervals. For a given wireless terminal the required signal transmission may not have to be precisely periodical, e.g., it may occur at a time within an assigned transmission recurring time window. One example of such regular signal transmission in a closed-loop timing controlled system is described in U.S. patent application Ser. No. 09/503,040, wherein each wireless terminal transmits a particular signal, called a timing control signal, to the base station. For each wireless terminal in such systems, the timing control signal is transmitted in regularly recurring time slots so that the base station can track the arrival time of the received timing control signal and correct the transmission timing of the wireless terminal, thereby ensuring system synchronization. However, for a given wireless terminal, the timing control signal need not, but often is, transmitted at precisely periodic recurring time instants.

Thus, one known method of scheduling the transmission of signals is to use a traditional time division multiple access (TDMA) approach, where a given wireless terminal is assigned a set of time slots that recur at precisely periodic intervals. Different wireless terminals in a cell are assigned different sets of time slots so that transmissions of those wireless terminals do not collide with each other. One drawback of this approach is that mutual interference caused by wireless terminals in adjacent cells may be highly correlated. This is because when a time slot assigned to a wireless terminal A corresponding to a first base station substantially overlaps with a time slot of another wireless terminal B corresponding to an adjacent base station, the next time slot of wireless terminal A will also overlap with the next time slot of wireless terminal B as the assigned time slots recur periodically. Correlated interference of this type causes signals transmitted by the same two wireless terminals to repeatedly interfere with each other over a long period of time. If the two interfering wireless terminals are disadvantageously located, the base stations in the overlapping cells may not be able to detect the signals correctly from the two interfering wireless terminals for a long period of time.

A problem with known cellular communications systems is that transmission by wireless devices in one cell may collide with transmissions by wireless devices in a neighboring cell. When transmissions by a device use the same frequency or set of frequencies repeatedly, multiple collisions may occur over a period of time due to the operation of devices in neighboring cells. This problem is particularly noticeable where transmissions are periodic or nearly periodic.

In view of the above discussion, it becomes apparent that there is a need for minimizing the potential for collisions between transmissions which occur in neighboring cells of a wireless communications system. In addition, it is desirable that the probability that transmissions from devices in neighboring cells will collide on a periodic basis be minimized thereby allowing increasing the chance that transmission from a device to a base station will not be blocked do to collisions for extended periods of time.

SUMMARY OF INVENTION

The present invention is directed to methods and apparatus for minimizing interference due to recurring signal transmissions in neighboring cells of a wireless communications system. One particular feature of the invention is directed to reducing or minimizing the chance that individual wireless devices, corresponding to neighboring cells, will have their signals collide in immediately sequential transmission periods thereby avoiding long periods of time where a wireless terminal is unable to communicate, e.g., with a base station, due to repeated signal collusions with a device in a neighboring cell.

In cellular communications systems, the transmission of regular signals between wireless terminals and base stations using the same frequency or set of frequencies can result in recurring periodic interference affecting neighboring base stations. Accordingly, there is a need for methods of scheduling the transmission of regular signals to reduce the possibility of recurring periodic inference between transmissions associated with adjacent or overlapping cells. Wireless terminals with which the present invention may be used include a wide range of mobile devices including, e.g., cell phones, wireless modems used in personal data assistants and notebook computers, etc.

This invention addresses the issue of scheduling regular signal transmissions. In many embodiments the signal transmissions which are scheduled in accordance with the invention are periodic signals. However, the scheduled signals are not required to be periodic or precisely periodic for the invention to work.

In accordance with various exemplary embodiments of the present invention, time slots assigned to a given wireless terminal recur in a regular, e.g., predictable, but not precisely periodic manner, so that if two wireless terminals associated with adjacent base stations, corresponding to neighboring overlapping cells, use the same time slots at one time, the two wireless terminals will use different time slots next time. Thus, mutual interference between wireless terminals in adjacent base stations is not likely to correlate with respect to sequential time slots.

As a result of the applied scheduling method, the base station in any given cell does not have to wait a long time before it is able to receive or transmit signals to an individual wireless terminal with the signals colliding with those from a neighboring cell.

In accordance with the invention, signal transmissions of the wireless terminals in each cell are scheduled on a group slot basis. A group slot comprises a number of time slots. Each wireless terminal serviced by a particular base station is assigned a time slot in a group slot used by the particular base station. A given wireless terminal is assigned different time slots in successive group slots as specified by a hopping function. Adjacent, base stations e.g., base stations of physically neighboring or overlapping cells, use distinct, i.e., different, hopping functions for the scheduling purpose thereby avoiding correlation of slots between overlapping or adjacent cells during consecutive group slots.

The hopping functions are implemented on a CPU or other device. The base stations as well as individual wireless transmitters implement the hopping function used in a given cell. Each wireless transmitter implements the hopping function using information received from the base station with which it communicates at any given time.

In accordance with the invention, in the case where the number of time slots in a group slot, N, is either a prime or a prime power, the hopping functions are constructed from a linear equation defined in the finite field of N. In this manner, the potential for collisions between devices of neighboring cells is reduced or minimized.

In the case where N is neither prime nor a prime power, the hopping functions are constructed using a two-step procedure. In the first step, a linear equation defined in the finite field of M, with M>N, is used to calculate a first index, whose range is from 0 to M−1. Then in the second step, an index swapping function is used to map the first index to a second index, whose range is from 0 to N−1. The second index specifies which time slot to be used in a group slot. The results of the time slot scheduling process are used to control the transmission of the regular signals from the wireless transmitters in a cell to the cell's base station.

By using hopping functions in accordance with the present invention for allocating communications times to wireless devices, e.g., mobile devices, of neighboring communications cells the potential for collisions is reduced.

Additional benefits, features and embodiments will be apparent from the detailed description which follows.

DETAILED DESCRIPTION OF INVENTION

Figure 1:
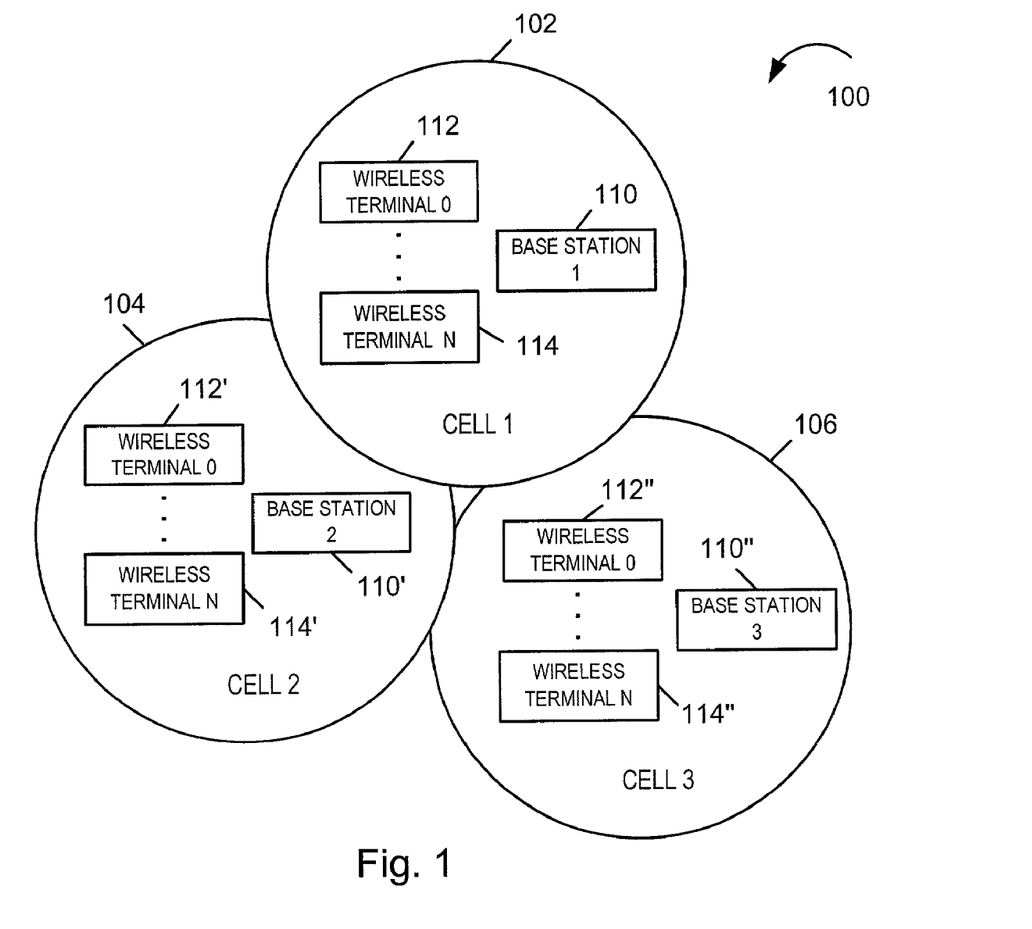
FIG. 1 illustrates a multi-cell communication system implemented in accordance with the invention.

FIG. 1 shows a communication system 100 implemented in accordance with the present invention including multiple cells 102, 104, 106. Each cell 104, 104, 106 includes a plurality of wireless terminals (112, 114), (112', 114') (112", 114") and a base station 110, 110', 110", respectively. Each wireless terminal includes a transmitter as well as a receiver. The wireless terminals may be mobile communications devices such as cell phones, personal data assistants with wireless modems, etc. Each base station 110, 110', 110" performs scheduling in accordance with the present invention. The wireless terminals use the hopping algorithm of the present invention along with information received from the base station to determine the time slots in which they are to transmit. Note that neighboring cells 102, 104, 106 overlap slightly thereby providing the potential for signal collisions between signals being transmitted by wireless devices in neighboring cells.

Figure 2:
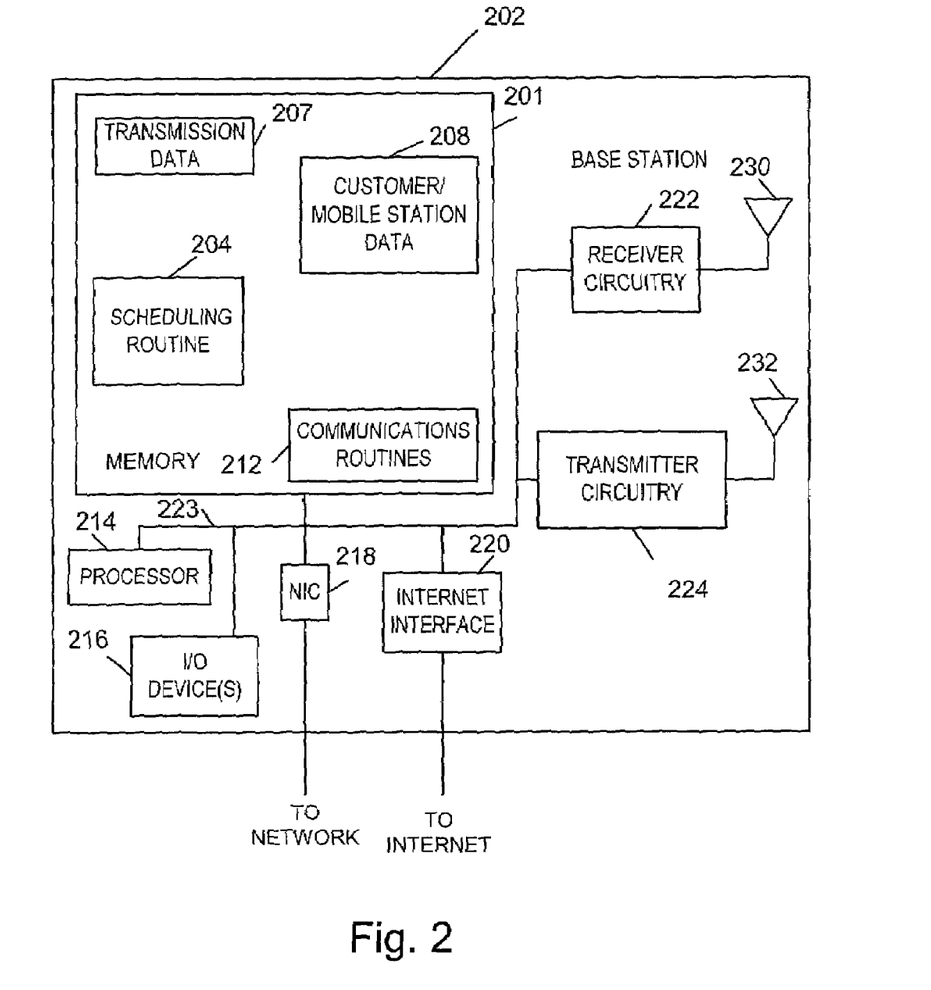
FIG. 2 illustrates a base station, suitable for use in the system of FIG. 1, which implements the scheduling method of the present invention.

FIG. 2 illustrates an exemplary base station 202. The base station 202 may be used as any one of the base stations 110, 110', 110" of the system 100. The base station 202 includes a processor 214, memory 201, input/output (I/O) device 216, network interface card 218, internet interface 220, a receiver circuit 222 and a transmitter circuit 224 which are coupled together by a bus 223.

The processor 214, may be, e.g., a general purpose central processing unit (CPU). Processor 214 controls operation of the base station 202 under direction of one or more routines stored in memory 201. Memory 201 includes a scheduling routine 204, communications routines 212, transmission data 207 and customer/mobile station data 208. Scheduling routine 204 is used to schedule the transmission of data and signals to wireless terminals served by the base station 202. It is also used to determine when wireless terminals may be broadcasting predictable signals to the base station 202. The hopping function of the present invention, which will be discussed in detail below, is implemented by instructions included in scheduling routine 204. Communications routines 212 are responsible for controlling, when executed by the processor 214, the receipt, transmission of data via receiver circuit 222 and transmitter circuit 224. Antennas 230, 232 are coupled to receiver circuit 222 and transmitter circuit 224, respectively, and are used for receiving and broadcasting data and other signals, respectively.

Customer/mobile station data 208 includes information such as the maximum number of wireless terminals which may be served by the base station 202, information identifying wireless terminals which are being serviced by the base station 202 at a particular point in time, the number of wireless terminals registered with the base station 202 as well as other customer and/or wireless terminal related information. Transmission data 207 is data that is to be transmitted to wireless terminals, data received from wireless terminals and/or information relating to the transmission or receipt of data.

NIC 218 provides an interface through which the bases station 202 can connect to a network, e.g., a corporate LAN or WAN. Internet interface 220 servers as an interface to the Internet through which wireless terminals interacting with the base station 202 can send and receive data and perform other Internet access operations.

Figure 3:
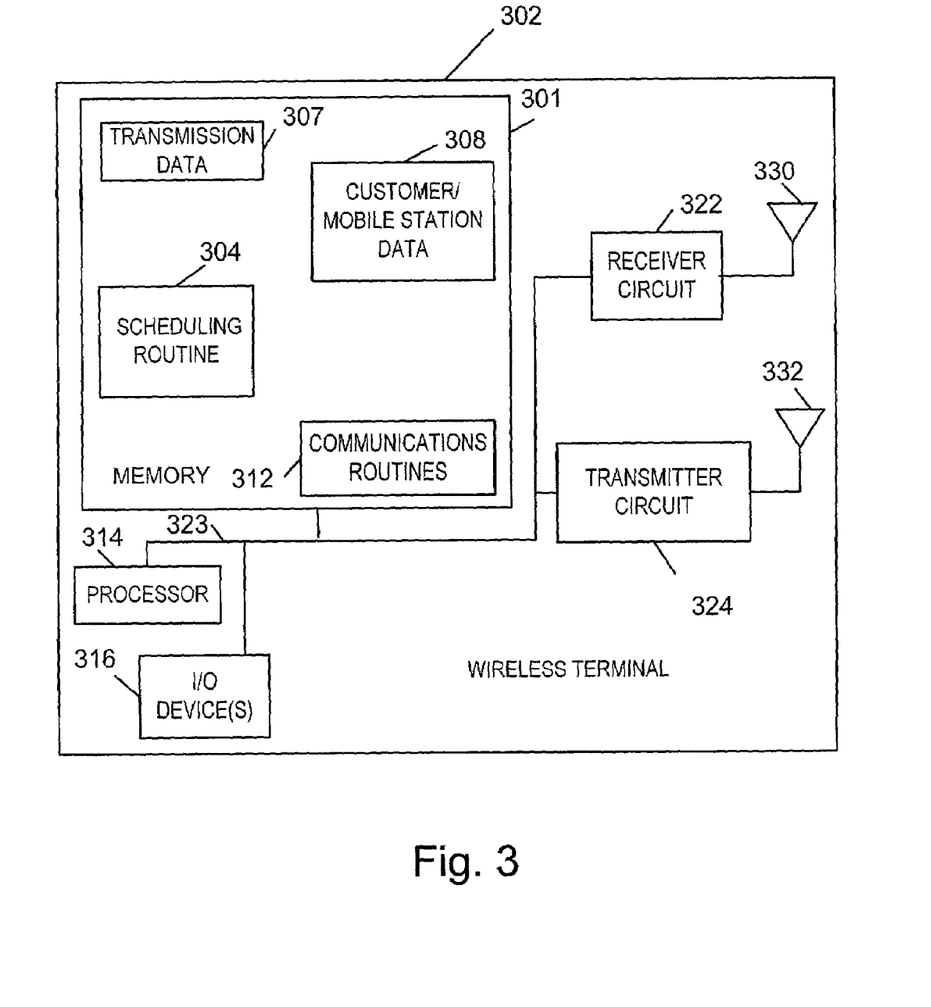
FIG. 3 illustrates a wireless terminal, suitable for use in the system of FIG. 1, which implements the transmission scheduling method of the present invention.

FIG. 3 illustrates an exemplary wireless terminal 302 which can be used as any one of the wireless terminals of the system 100 shown in FIG. 1. The wireless terminal 302 includes a processor 314, memory 301, input/output (I/O) device 316, a receiver circuit 322 and a transmitter circuit 224 which are coupled together by a bus 323. An antenna 330 used for receiving signals from a base station is coupled to receiver circuit 322. An antenna 332 used for transmitting signals, e.g., to base station 110 is coupled to transmitter circuit 324.

Wireless terminal scheduling routine 304, when executed by processor 314, is used to determine when the wireless terminal 302 is to transmit one or more signals to the base station with which the wireless terminal 302 is registered. The scheduling routine 304 uses a hopping function, implemented in accordance with the present invention, along with information received from the base station, to determine the time slots in which it should transmit.

Figure 4:
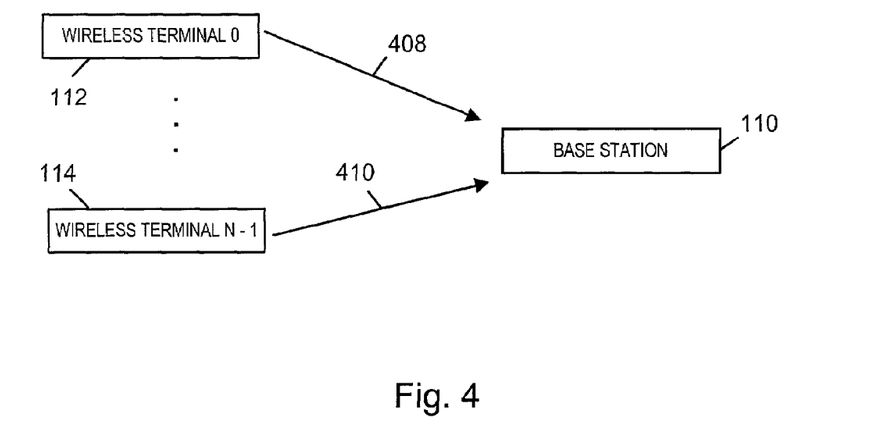
FIG. 4 illustrates the transmission of signals from a plurality of wireless terminals to a base station.

FIG. 4 shows the components of an exemplary cell 102 in which base station 110 serves multiple wireless terminals, i.e., terminals 0 to N-1 112, 114. Each wireless terminal 112, 114 transmits one or more signals 408, 410 to the base station 110 regularly. For purposes of explaining the invention N is used to denote the maximum number of the wireless terminals to be supported by the base station 110. The wireless terminals 112, 114 are indexed from purposes of explaining the invention from 0 to N-1. At any given time, the actual number of wireless terminals in the system may be less than N. Transmissions to the base station 110 are scheduled on a group slot basis, e.g., with each one of the N devices being allocated a time slot in which to transmit during each group slot. Group slots occur at periodic intervals, i.e., on group slot follows another over time.

Figure 5:
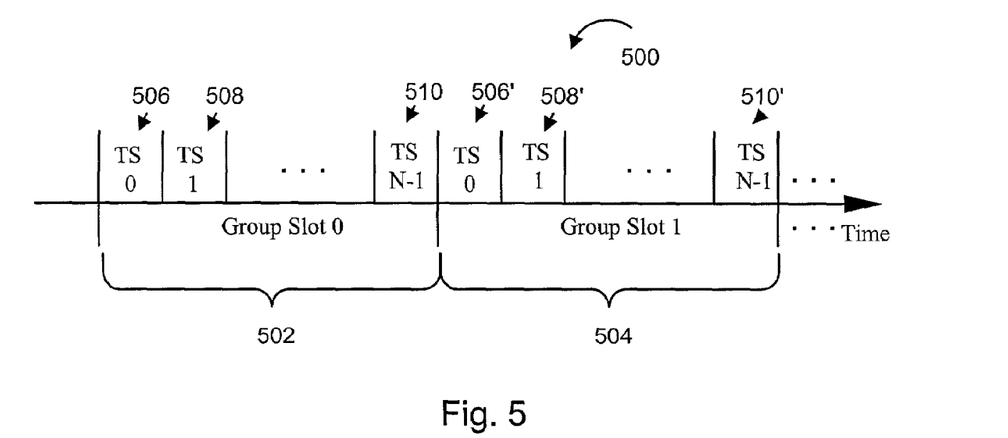
FIG. 5 illustrates a series of group slots and the individual transmission time slots included in each group slot in accordance with the invention.

FIG. 5 shows two exemplary sequential group slots 502, 504 and the N time slots (506, 508, 510), (506', 508', 510') in each group slot. A group slot has N time slots, one for each possible transmitter, e.g., wireless terminal, in a cell, e.g., cell 102, used at any given time. Time slots in a group slot are indexed from 0 to N-1. Group slots recur periodically and are indexed using integer vales such as 0, 1, 2, . . . , X.

In accordance with the invention, the wireless terminals 112, 114 in a cell 102 are scheduled on a group slot basis by the base station 110. Scheduling routine 204 is executed by the base station's CPU 214 when scheduling is to be performed.

In a group slot 502, 504, each wireless terminal 112, 114 is allocated one time slot for signal transmission. The base station 110 uses a hopping function, f(m,g), to determine the index of the time slot assigned to a wireless terminal 112, 114 of index m in a group slot of index g.

For example consider where group slots are index 0 to X, and time slots are indexed within a group slot from 0 to N-1. In such a case, m may assume the values from 0 to N-1 and g may assume values 0 to X.

In order to avoid collision, in the base station the following constraint is applied, $f(m_1,g) \neq f(m_2,g)$ for any $m_1 \neq m_2$, i.e., each device in the cell is allocated a different time slot in each group time slot in which to transmit.

In order to reduce the correlation of interference between signals transmitted by the wireless terminals in adjacent base stations, adjacent base stations 102, 104, 106 are programmed to use different hopping functions. For purposes of implementation simplicity, the maximum number of wireless terminals each base station 102, 104, 106 may support may be the same, i.e., N.

In accordance with one feature of the present invention when N, the number of time slots in a group slot, is a prime number or a prime power, the hopping function is given as follows:

$$f(m,g) = Z(A*g+m, N)$$

where parameter A is a constant stored in a base station 110 as part of the scheduling routine 204. Adjacent base stations are controlled to store and use different values for A. In the above function "*" represents addition while "+" represents multiplication. Through the use of the Z( ,N) operation, the addition and multiplication operations in the above equation are defined in the finite field of order N. The various operations used to implement the function f(m,g) are well known in the art.

The resultant f(m,g) is an integer number from 0 to N-1, and is used as the index of the time slot assigned to wireless terminal m in group slot g.

Consider for example the case where a base station is assigned the value of A=3 and N=7. In this case, as N is a prime number, the Z operation becomes the modular operation over N. thus denoting as mod( ,N) in the following.

For the device assigned index 5 (m=5) the time slot allocation for group slot 1 (g=1) would be as follows:

$$f(5,1) = \mod(3*1+5, 7) = \mod(8,7) = 1$$

Meanwhile for the device assigned index 6 (m=6) the time slot allocation for group slot 1 (g=1) would be as follows:

$$f(6,1) = \mod(3*1+6, 7) = \mod(9, 7) = 2.$$

Accordingly, the base station assigns mobile terminal with index 5 time slot 1 for group slot 1 and mobile terminal with index 6 time slot 2 for group slot 1.

For the next group slot, group slot 2 (g=2) mobile terminal with index 5 would be allocated a time slot as follows:

$$f(5,2) = \mod(3*2+5, 7) = \mod(11, 7) = 4.$$

Meanwhile for the device assigned index 6 (m=6) the time slot allocation for group slot 2 (g=2) would be as follows:

$$f(6,2) = \mod(3*2+6, 12) = \mod(12, 7) = 5.$$

Accordingly, the base station assigns mobile terminal with index 5 time slot 4 for group slot 2 and mobile terminal with index 6 time slot 5 for group slot 2.

Neighboring base stations are assigned different values for A resulting in different hopping function even in cases where N is the same for each system. For example, in the system 100, base station 110 may be assigned the value 1 for A, base station 110' may be assigned the value 2 for A while base station 110" may be assigned the value 3 for A.

When a wireless terminal, e.g., terminal 112, enters a new cell 102, 104, or 106, the base station 110 in the cell communicates the wireless terminal's slot index m and the value A to be used to implement the hoping function. The value N may also be communicated to the wireless terminal but, in some embodiments, N is fixed and therefore need not be transmitted. The values m, N and A may be explicitly communicated, e.g., transmitted to a wireless terminal, or implicitly communicated. In the case of implicit communication, one or more values m, N, g and/or A are derived from information and/or signals transmitted to wireless terminal.

While the base station implements the hopping function in accordance with the present invention to determine which time slots of a group slot are to be used by individual wireless terminals, each wireless terminal also implements the hopping function to determine which time slot in a group slot it is to use for transmissions to the base station with which is communicating at any given time.

Figure 6:
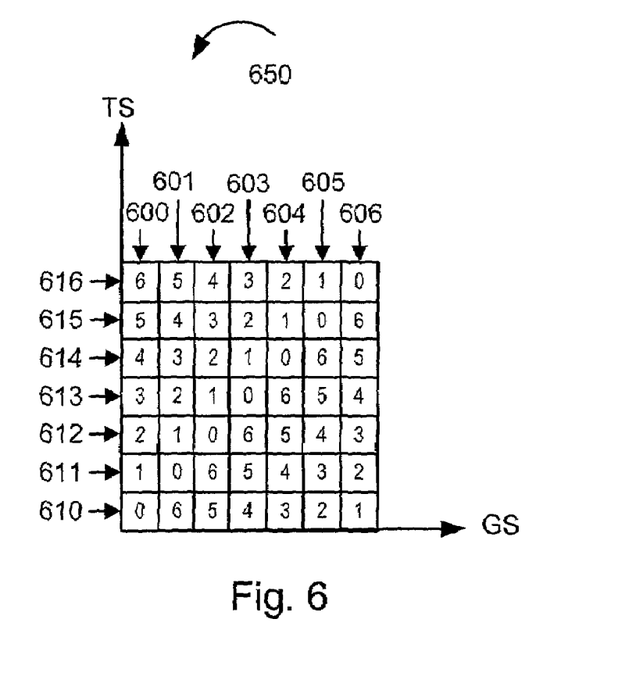
FIGS. 6 and 7 illustrate the exemplary allocation of time slots, in a plurality of sequential group slots, in accordance with various exemplary embodiments of the present invention.

FIG. 6, is a table 650 showing the value of the hopping function when N=7 and A=1. In this case, N is a prime number. Each of rows 610 through 616 in FIG. 6 corresponds to a different one of the 7 wireless terminal time slots present in a group slot. Columns 600 through 606 in FIG. 6 correspond to individual group time slots, i.e., slots 0, . . . , 6, respectively. Each element in the table 650 is a terminal index that identifies the wireless terminal transmitter assigned to use the time slot to which the grid location corresponds.

By reading across a row 610, 611, 612, 613, 614, 615, 616, it is possible to determine the terminal assigned to a particular time slot in each of the successive group slots represented by the columns 600, 601, 602, 603, 604, 605, 606. Each entry in the chart 650 lists the number of a terminal assigned to the corresponding time slots 0, ..., 6 in a given group slot. For example, suppose the first column 600 is used for group slot 0. Thus in group slot 0, wireless terminal 0 is assigned time slot 0, wireless terminal 1 is assigned time slot 1, and so forth. The second column 601 is then used for group slot 1. Thus in group slot 1, wireless terminal 6 is assigned time slot 0, wireless terminal 0 is assigned time slot 1, wireless terminal 1 is assigned time slot 2, and so forth.

Figure 7:
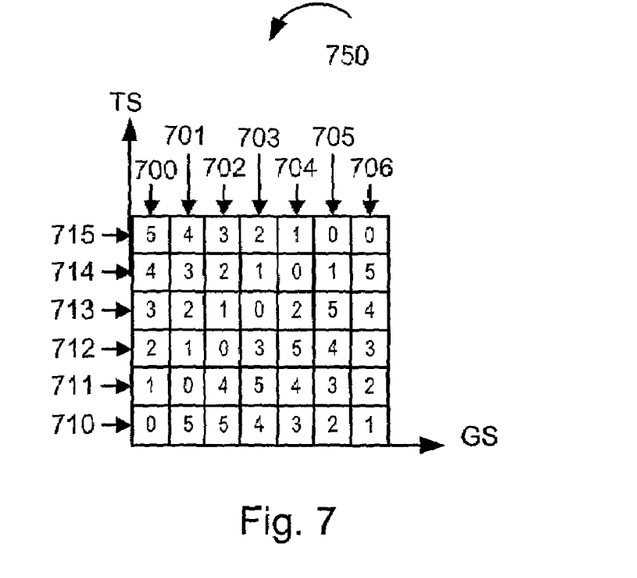

FIG. 7 shows the construction, e.g., time slot allocations, of an exemplary hopping function, in accordance with the invention.

In the case where N is neither a prime number nor a prime power. In the FIG. 7 example N is equal to 6. The construction of the hopping function comprises two steps as follows:

Let M to be a prime number or a prime power that is greater than N. Preferably, M should be chosen as small as possible. For example assuming N=6, M=7 is a suitable choice.

In the first step, a function is fined as follows:

$$f1(m,g)=Z(A*g+m, M).$$

The definitions of the parameter A and indices g and m are the same as in the case where N is a prime number or a prime power discussed above. The difference of the equations used to produce the data when N is not a prime number or prime power and in the above described example where it is, is that the addition and multiplication operations in the equation used to produce the function values f1(m,g) are defined in the finite field of order M, instead of N. The resultant f1(m,g) is an integer number from 0 to M−1, and is called herein the first index.

Since M is greater than N, this first index may exceed the maximum used index value N−1. As part of the second step of implementing the hopping function of the invention, the value of all or some of the individual first indexes are mapped to another index, e.g., an index in the utilized time slot range of 0 to N−1. Remapping of index values from first to second index values may be limited to first index values which fall outside the utilized time slot index range of 0 to N−1.

Thus, in the second step, which is used when N is neither a prime number or a prime power, the first index is mapped to another index, called the second index. The following exemplary index swapping function may be used for this purpose. The second index specifies the actual index of the time slot assigned to a wireless terminal in a group slot when N is neither a prime number or prime power.

For m=0, ..., N−1, if the first index, f1(m,g), is less than N, then the second index is equal to the first index. Suppose that for m=0, ..., N−1, there are L wireless terminal indices whose first indices are greater than or equal to N. For purpose of explanation let us denote these wireless terminal indices as $m_1, ..., m_L$. The second indices of wireless terminals $m_1, ..., m_L$ are determined as follows. There are exactly L indices $i_1, ..., i_L$, where $N \leq i_1, ..., i_L < M$, such that $0 \leq f1(i_1,g), ..., f1(i_L,g) < N$. In accordance with the present invention the first indices $f1(m_1,g), ..., f1(m_L,g)$ are swapped into $f1(i_1,g), ..., f1(i_L,g)$ to generate the second indices. Hence, wireless terminals $m_1, ..., m_L$ are assigned time slots $f1(i_1,g), ..., f1(i_L,g)$ in group slot g. In one embodiment of the invention, wireless terminal $m_j$ is assigned time slot $f1(i_j,g)$, for j=1, ..., L.

FIG. 7 illustrates a chart 750 corresponding to the case where N=6 and A=1 for the hopping function of the invention. In such a case, N is neither a prime nor a prime power.

For purposes of explanation, assume M is set M=7. In such a case, the first indices can be generated using the table in FIG. 6. Based on a review of FIG. 6, it can be seen that the first indices of wireless terminals 0, ..., and 4 are less than 6. Thus, the second indices of those wireless terminals are set equal to the corresponding first indices. Thus, wireless terminal indices 0 through 4 are positioned in the same row/column locations in FIGS. 6 and 7.

A need to assign different values to the terminal index occurs when the first terminal index falls outside the utilized range of 0 to N−1. Consider for example that the first index of wireless terminal 5 is equal to 6, (see col. 601, row 616) which is equal to N. Meanwhile index 6 (recall that 6 is equal to N) occupies time slot 0 according to the second column 601 of the table 650. This means that the time slot 0 of group slot 1 (710, 701) is available for use by wireless terminal transmitter 5. Thus, the second index of wireless terminal 5 is mapped to time slot 0 in group slot 1 702 in accordance with the recapping step of the invention. The remaining columns of the table 750 in FIG. 7 are derived from the table 650 using the same index swapping method that was just discussed.

Various index swapping techniques may be used to remap the first index values to second index values with the above described technique being but one example.

The steps of the various methods of the invention discussed above may be implemented in a variety of ways, e.g., using software, hardware or a combination of software and hardware to perform each individual step or combination of steps discussed. Various embodiments of the present invention include means for performing the steps of the various methods. Each means may be implemented using software, hardware, e.g., circuits, or a combination of software and hardware. When software is used, the means for performing a step may also include circuitry such as a processor for executing the software. Accordingly, the present invention is directed to, among other things, computer executable instructions such as software for controlling a machine or circuit to perform one or more of the steps discussed above.

The invention claimed is:

1. A method of scheduling the transmission of signals between a plurality of wireless terminals and a base station in at least one cell of a communications system, the base station being capable of servicing N wireless terminals at a time, the method comprising the steps of:
assigning transmission time slots to individual wireless terminals in said at least one cell on a group slot basis over a period of time corresponding to X sequential group slots, each group slot including N transmission time slots which may be assigned to an individual wireless terminal for purposes of signal transmission, where X and N are integers greater than 1, the step of assigning time slots including:
using a hopping function to assign time slots to wireless terminals during successive group slots, the hopping function assigning each wireless terminal a different time slot in immediately successive group slots.

2. The method of claim 1, wherein when N is a prime number or a prime power; and wherein the hopping function is constructed from a linear equation defined in the finite field of N.

3. The method of claim 2, wherein the hopping function is implemented using a two step procedure including:
i. using a linear equation defined in the finite field of M, where M>N, to calculate a first set of indices, the first set of indices assuming values in the range of 0 to M−1; and
ii. using an index swapping function to map each index in the first set of indices to an index in a second set of indices assuming values in the range of 0 to N−1, the second set of indices specifying which times slots are assigned to each of the terminals in the said at least one cell during a group slot.

4. The method of claim 1, further comprising:
scheduling the transmission of signals between a second plurality of wireless terminals and a second base station in a second cell of a communications system, the second cell neighboring said at least one cell, the second base station being capable of servicing N wireless terminals at a time, the method comprising the steps of:
assigning transmission time slots to individual wireless terminals in said second cell on a group slot basis over a period of time corresponding to X sequential group slots, each group slot including N transmission time slots which may be assigned to an individual wireless terminal for purposes of signal transmission, the step of assigning time slots including:
using a second hopping function which is different than said hopping function used to assign time slots to wireless terminals in said at least one cell, the second hopping function assigning each wireless terminal in said second cell a different time slot in immediately successive group slots.

5. The method of claim 4, wherein said hopping function is implemented using a first constant and said second hopping function is implemented using a second constant, the first and second constants differing from each other.

6. The method of claim 5, further comprising the step of:
communicating the first constant to a wireless terminal that enters said at least one cell.

7. The method of claim 6, further comprising the step of:
communicating information identifying the current group slot in the sequence of X group slots to the wireless terminal that enters said at least one cell.

8. The method of method of claim 6, further comprising the step of:
communicating the second constant to a wireless terminal that enters said second cell.

9. The method of claim 6, wherein N and X are the same in said at least one cell and said second cell.

10. The method of claim 6, wherein the said at least one cell and said second cell at least partially overlap.

11. A method of scheduling communication between a first device and a second device in a first cell, the first device being capable of communicating with N devices in the first cell, the method comprising the step of:
operating the second device to receive signals from the first device in the first cell;
determining, from the received signals, a constant value to be used in implementing a transmission scheduling function, and a device index used to uniquely identify the second device from each of the other N−1 devices with which the first device may communicate in the first cell, wherein N is a positive integer greater than 1; and
implementing a scheduling function, using the determined constant value and device index, that assigns one time slot in each of a plurality of sequential group slots to be used for transmission from said second device to the first device in the first cell, each group slot including N time slots, the scheduling function assigning a different time slot to the device in at least two out of every 3 immediately sequential group slots.

12. The method of 11, further comprising:
determining from the received signals the current group slot in a sequence of X group slots used in the first cell, and
said scheduling function assigning time slots to said device in a manner which repeats every X group slots, where X is a positive integer greater than one.

13. The method of claim 12, wherein X and N are the same.

14. The method of claim 13, wherein the step of implementing a scheduling function includes implementing a linear function defined in the finite field of N.

15. The method of claim 12, further comprising:
storing the constant value determined from a signal received for the first device of the first cell while said second device remains in said first cell.

16. The method of claim 15,
wherein said first device of the first cell is a base station; and wherein said second device is a mobile wireless terminal.

17. The method of claim 14, wherein the linear function has the form:
f(m,g)=Z(A*g+m, N);
where m is equal the determined device index;
A is equal to the determined constant value;
g is a value indicating a particular group slot in the sequence of X recurring group slots; and
where the Z( , N) operation defines the result of the operation f(m,g) to a finite field of order N.

18. The method of claim 11, wherein the method further includes scheduling communication between a first device in a second cell and said second device in response to the second device entering the second cell, the first device in the second cell being capable of communicating with N devices in the second cell, the method comprising the step of:
operating the second device to receive signals from the first device in the second cell;
determining, from the received signals, a second constant value to be used in implementing a transmission scheduling function, and a second device index used to uniquely identify the second device from each of the other N−1 devices with which the first device in the second cell may communicate, wherein N is a positive integer greater than 1; and
implementing a second scheduling function, using the determined second constant value and second device index, that assigns one time slot in each of a plurality of sequential group slots to be used for transmission from said second device to the first device in said second cell, each group slot including N time slots, the scheduling function assigning a different time slot to the second device in at least two out of every 3 immediately sequential group slots.

19. The method of 18, further comprising:
determining from the received signals the current group slot in a sequence of X group slots used in the second cell, and said second scheduling function assigning time slots to said device in a manner which repeats every X group slots, where X is a positive integer greater than 2.

20. The method of claim 17, wherein X and N are the same.

21. A communications system, comprising:
a first communications cell, the first communication cell including:
 a first base station capable of receiving communicating with N devices in said first communications cell, said first base station including:
  a storage device for storing a first constant used by said first base station; and
  means for assigning one transmission time slot in each of X sequential group slots, to each transmission terminal in said first cell, each group slot including N transmission time slots, said assigning means using said stored first constant to implement a hopping function which determines which transmission time slot in a given group slot is assigned to a wireless terminal, each wireless terminal in the first cell being assigned a different time slot in at least two out of three immediately successive ones of said X group slots, X and N being positive integers greater than one.

22. The communications system of claim 21, further comprising:
a second communications cell, the second communications cell including:
 a second base station capable of receiving communicating with N devices in said second communications cell, said second base station including:
  a storage device for storing a second constant used by said second base station; and
  means for assigning one transmission time slot in each of X sequential group slots, to each transmission terminal in said second cell, each group slot including N transmission time slots, said assigning means using said stored second constant to implement a hopping function which determines which transmission time slot in a given group slot is assigned to a wireless terminal, each wireless terminal in the second cell being assigned a different time slot in at least two out of three immediately successive ones of said X group slots.

23. The communications system of claim 22, wherein the first and second constants are different.

24. The communications system of claim 23, wherein X and N are positive integers greater than 2.

25. The communications system of claim 24, wherein X and N are equal.

26. The communication system of claim 23, wherein the first base station further includes:
 transmitter circuitry for transmitting the first constant to wireless terminals in the first cell.

27. The communication system of claim 26, wherein the second base station further includes:
 transmitter circuitry for transmitting the second constant to wireless terminals in the second cell and for transmitting a signal from which the wireless terminals in the second sell can determine the current group slot in the sequence of X group slots.

28. A portable communications device, comprising:
 a receiver circuit for receiving signals from a base station;
 means for determining, from the received signals, a constant value to be used in implementing a transmission scheduling function, and a device index used to uniquely identify the portable communications device other devices with which the first device may communicate; and
 means for implementing a scheduling function, using the determined constant value and device index, that assigns one time slot in each of a plurality of sequential group slots to be used for transmission from said portable device to the base station, each group slot including N time slots, the scheduling function assigning a different time slot to the device in at least two out of every 3 immediately sequential group slots.

29. The device of claim 28, wherein said means for determining further includes:
 circuitry for determining from a received signal the current group slot in a sequence of X group slots used in the first cell.

30. The device of claim 29 wherein the means for implementing a scheduling function assigns time slots to said device in a manner which repeats every X group slots, where X is a positive integer greater than one.

31. The method of claim 30, wherein X and N are the same.

* * * * *